United States Patent Office 2,820,790
Patented Jan. 21, 1958

2,820,790

ACRIDINE VAT DYES

William Baptist Hardy, Bound Brook, N. J., and Oscar George Birsten, New York, N. Y., assignors to American Cyanamid Company, New York, N. Y., a corporation of Maine No Drawing. Application December 17, 1956
Serial No. 628,496

5 Claims. (Cl. 260—274)

This invention relates to new acridine vat dyes, and more particularly to 16 H - isothiazolo[5',4',3',5,10] anthra[2,1,9-mna]-napth[2,3-h]acridine-10,15-dione 4,4-dioxide have the basic ring structure:

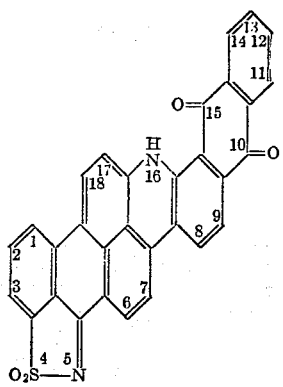

This application is a continuation-in-part of our application Serial Number 448,754, filed August 9, 1954, and now Patent Number 2,799,682, entitled "5(S)10(N)isothiazolobenzanthracenedioxides."

Quinone sulfimines having the structures

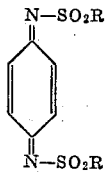

and

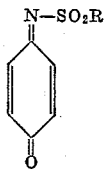

and the corresponding naphthoquinone and anthraquinone derivatives, have recently been described by Adams et al. in a series of articles appearing in the "Journal of the American Chemical Society." These compounds are very sensitive to alkali, losing sulfonic acid and ammonia when heated with strong alkali. Consequently, such compounds are useless in the preparation of fused ring systems of the benzanthrone type where alkali fusion to produce such ring systems is required.

The present invention is based upon the discovery that a somewhat analogous cyclic structure in which the $SO_2$ group is ring closed into the anthraquinone system is stable to alkali fusion and is highly useful in the preparation of condensed ring systems needed for the deep shades of vat dyes. We have found that the isothiazolodioxide ring system, as described more particularly hereinafter, may be used to prepare a benzanthrone analog by the standard benzanthrone synthesis. Bromination of the novel benzanthrone analog produces a bromobenzanthrone analog which can be condensed with alpha-amino-anthraquinones to form anthrimides, which may then be fused in alcoholic alkali to produce acridine vat dyes.

It is a surprising feature of the present invention that the isothiazolodioxide ring system survives the drastic step of alkali fusion at high temperatures when the analogous open chain quinone sulfimines are readily decomposed by this treatment.

The preparation of the intermediates may be carried out by first treating 1(S)9(N)isothiazoloanthraquinonedioxide of the structure

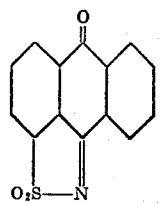

which may be prepared by the method of Ullmann and Kertesz [Ber. 52, 545 (1919)], with glycerin, sulfuric acid and a reducing metal in the standard benzanthrone condensation to produce 5(S)10(N)isothiazolobenzanthracenedioxide of the structure

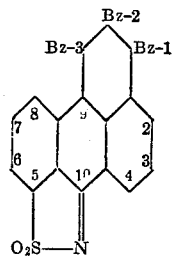

The numbering system used is shown in the above formula. For convenience, double bonds are not shown where the location is obvious. It is believed that this is the correct structure because it is highly unlikely that the formation of the new ring would occur by ring closure into a ring already substituted by a sulfonyl group, especially when an unsubstituted ring is equally available. However, this point is not certain and we do not wish to be limited thereby.

The basic ring system could also be named as 5(S) 10(N) isothiazolobenzanthronedioxide, or by the Chemical Abstracts system as benzonaphtheno[1,2,3,-cd][1,2] benzisothiazole 2,2-dioxide or phenaleno[1,2,3,-cd][1,2] benzisothiazole 2,2-dioxide:

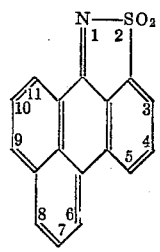

By a frequently used oxa-aza system, the name would be 2-thia-1-aza-2H-benz[h,i]aceanthrylene-2,2-dioxide. The characteristics of the compound are accentuated by naming the compound as an isothiazolobenzanthracenedioxide, and such terminology is used elsewhere in this specification.

The isothiazolobenzanthracenedioxide can be brominated in acetic acid to produce Bz-1-bromo-5(S)10(N)

isothiazolobenzanthracenedioxide. Chlorination of the isothiazolobenzanthronedioxide can also be carried out to give the related chloro compounds, although the brominated compounds are preferred since they react more readily with aminoanthraquinones. Even a large excess of bromine is found to give a mono-bromo derivative. By analogy with the bromination of benzanthrone such substitution is in all probability at the Bz-1 position. The intermediates can be readily condensed with aminoanthraquinones to give anthrimides which may then be ring closed by fusion in a potassium hydroxide methanol mixture to produce acridine green dyes.

Various substituted 1-amino anthraquinones may be used to form the anthrimides. Examples of such amino anthraquinones are 1-amino-4-benzamido-anthraquinone, 1-amino-4-methoxy anthraquinone, 1-amino-6-methoxy anthraquinone, and the like. In some instances the substituent group in the aminoanthraquinone may be attacked during the ring closure by fusion in a potassium hydroxide methanol mixture. For example, in the case of alkoxy derivatives, some dealkylation usually takes place under the conditions used. However, if it is desired that the final dye retain the alkoxy group, the dealkylated material may be realkylated after the ring closure fusion. Again, benzamido groups are usually cleaved during the closure of the acridine ring; the resultant free amino compound can be after-acylated or alkylated.

These reactions are believed to go through the following scheme, using alpha-aminoanthraquinone for purposes of illustration.

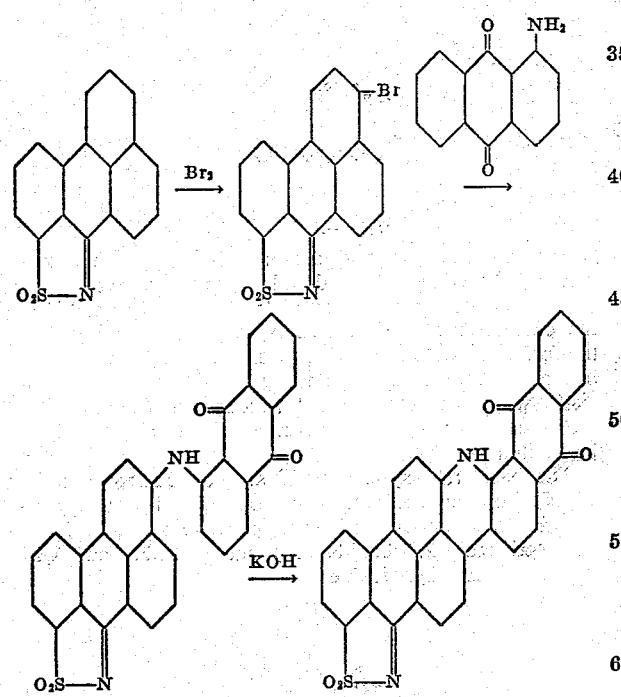

The isothiazolobenzanthracenedioxide can also be nitrated. Reduction of the nitro compound with ferrous sulfate and ammonia readily gives the aminoderivative. This too may be condensed with halogenoanthraquinones to give anthrimides similar to those prepared from the bromo substituted isothiazolobenzanthronedioxide.

The 5(S)10(N)isothiazolobenzanthracenedioxide also may be prepared with substituents in the ring. Thus, for example, Bz-2-methyl and Bz-2-phenyl derivatives can be prepared by the use of methacrolein and 2-phenyl-acrolein, respectively, instead of glycerin or acrolein in the standard benzanthrone synthesis.

Also, the isothiazoloanthraquinonedioxide may be prepared from substituted anthraquinones, as, for example, when 1-sulfo-2-methylanthraquinone is used, an isothiazolobenzanthracenedioxide is obtained in which a methyl group is ortho to the sulfur on the 6 position in the ring. In a similar manner isothiazolobenzanthracenedioxides with substituents in the anthraquinone ring may be prepared by using 1-sulfoanthraquinones containing substituents such as alkoxy, aryloxy, carboxy, nitro and halogen in positions 3, 4, 6, 7 or 8, and such intermediates used for preparation of the present dyes.

The invention will be described in greater detail in conjunction with the following specific examples in which the parts are by weight unless otherwise specified.

EXAMPLE 1

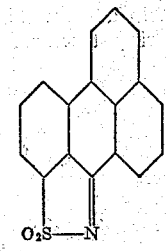

A mixture of 5.4 parts of 1(S)9(N)isothiazoloanthraquinonedioxide, 3.1 parts of glycerin, 1.2 parts of hydrated copper sulfate, and 6.1 parts of water is stirred while 51.9 parts of concentrated sulfuric acid are added, the temperature being kept below 90° C. The mixture is then heated to 105° C. and 1.9 parts of zinc dust are added gradually at this temperature. The mixture is then drowned and the product is isolated by filtration. The filter cake is thoroughly extracted with dilute sodium hydroxide solution at room temperature after which the product is filtered, washed, and dried. It is a dark greenish-yellow solid which does not vat and does not melt below 320° C. It is insoluble in most organic solvents but slightly soluble in boiling nitrobenzene.

EXAMPLE 2

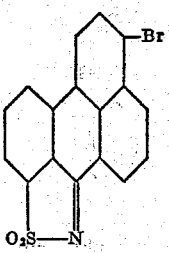

Five parts of the product of Example 1 are dissolved in 100 parts of sulfuric acid and the mixture is drowned. The precipitated product is filtered and washed acid free. The cake is then slurried in a mixture of 30 parts of water and 5 parts of concentrated hydrochloric acid. A solution of 31.2 parts of bromine in 30 parts of acetic acid is then added and the mixture is heated to 65° C. until bromination is complete. The reaction mixture is then drowned and excess bromine is destroyed with bisulfite. The product is isolated by filtration, washing, and drying. It is recrystallized from nitrobenzene and gives a good analysis for a monobromoisothiazolobenzanthracenedioxide. It is observed to have a melting point of 318–320° C.

EXAMPLE 3

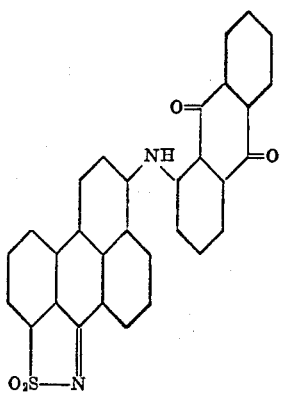

A mixture of 2.1 parts of the product of Example 2, 1.3 parts of alpha-aminoanthraquinone, 0.2 part of powdered copper, 0.2 part of iodine, 3 parts of anhydrous potassium carbonate, and 36 parts of nitrobenzene is stirred at 210° C. until the reaction is substantially complete. The mixture is then cooled to room temperature and the precipitated product is filtered and washed with nitrobenzene and alcohol. It is then slurried in dilute hydrochloric acid and the final product is isolated by filtration and washing.

EXAMPLE 4

16H-isothiazolo[5',4',3',5,10]anthra[2,1,9-mna]naphth[2,3-h]-acridine-10,15-dione 4,4-dioxide

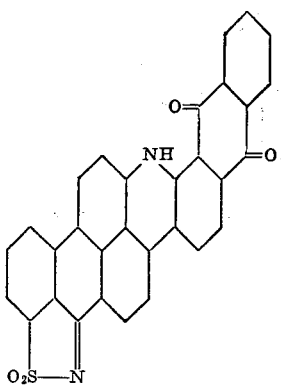

72 parts of potassium hydroxide and 40 parts of methyl alcohol are stirred together and heated to reflux. The resultant clear solution is then cooled to 140° C. and 2 parts of the product of Example 3 are added. The mixture is stirred at 147–150° C. until the reaction is substantially complete. No odor of ammonia is detectable throughout this reaction. The reaction mixture is drowned and the precipitated product is isolated by filtration and washing. The resultant product dyes cotton an olive green shade of excellent fastness to light.

EXAMPLE 5

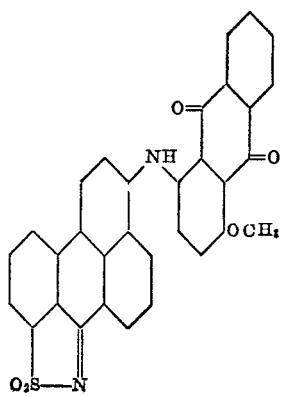

The procedure of Example 3 is followed except that an equivalent amount of 1-amino-4-methoxy anthroquinone is used in place of the 1-aminoanthraquinone. The product of the above formula is obtained.

EXAMPLE 6

9-methoxy-16H-isothiazolo[5',4',3',5,10]anthra[2,1,9-mna]naphth[2,3-h]acridine-10,15-dione 4,4-dioxide

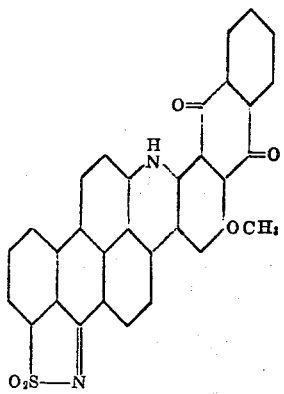

Ring closure of the product of Example 5 is effected using a procedure similar to that described in Example 4. The product which is formed contains some hydroxy compound which results from the dealkylation of the methoxy group. The demethylated product may be separated by extraction with an alkaline reagent. The demethylated product may be reconverted to the methylated product if desired by methylation with dimethyl sulfate.

EXAMPLE 7

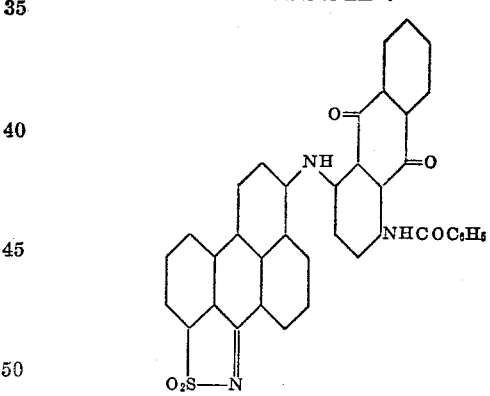

The procedure of Example 3 is followed except that an equivalent quantity of 4-benzamido-1-aminoanthraquinone is used in place of the 1-aminoanthraquinone.

EXAMPLE 8

9-amino-16H-isothiazolo[5',4',3',5,10]anthra[2,1,9-mna]naphth[2,3-h]acridine-10,15-dione 4,4-dioxide

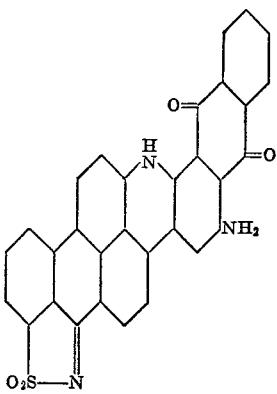

Ring closure of the product of Example 7 is effected by reaction with potassium hydroxide in methanol, using the procedure described in Example 4. The product which is obtained from the ring closure is the free amino product, since the benzamido group is hydrolyzed during the ring closure fusion.

We claim:
1. 16-H-isothiazolo[5',4',3',5,10]anthra[2,1,9-mna]-naphtha[2,3-h]acridine-10,15-dione 4,4-dioxides.
2. The dyestuff of the structure

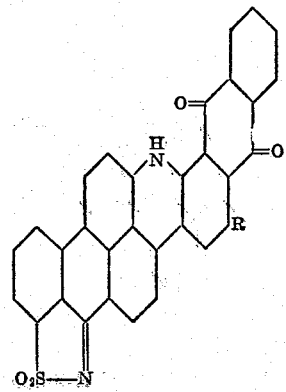

in which R represents a member of the group consisting of hydrogen, $CH_3O-$, and $NH_2-$.

3. The dyestuff of the structure

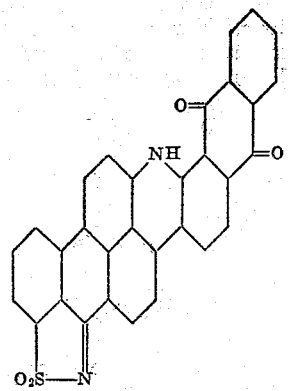

4. The dyestuff of the structure

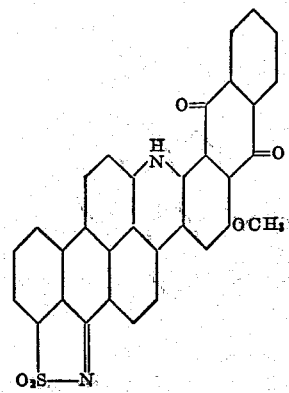

5. The dyestuff of the structure

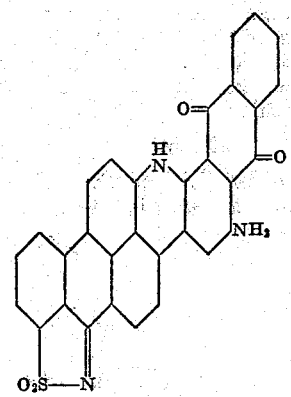

No references cited.